(12) United States Patent
Sakurai et al.

(10) Patent No.: US 10,805,730 B2
(45) Date of Patent: Oct. 13, 2020

(54) SOUND INPUT/OUTPUT DEVICE FOR VEHICLE

(71) Applicant: Toyota Jidosha Kabushiki Kaisha, Toyota-shi Aichi-ken (JP)

(72) Inventors: Hideyuki Sakurai, Toyota (JP); Masashi Mori, Nagoya (JP); Katsuya Shimazu, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/568,570

(22) Filed: Sep. 12, 2019

(65) Prior Publication Data
US 2020/0092649 A1    Mar. 19, 2020

(30) Foreign Application Priority Data
Sep. 14, 2018    (JP) .................................. 2018-172610

(51) Int. Cl.
| H04B 1/00 | (2006.01) |
| H04R 5/02 | (2006.01) |
| H04R 1/32 | (2006.01) |
| H04R 5/04 | (2006.01) |
| G06K 9/00 | (2006.01) |
| H03G 3/20 | (2006.01) |

(52) U.S. Cl.
CPC .......... *H04R 5/02* (2013.01); *G06K 9/00845* (2013.01); *H04R 1/323* (2013.01); *H04R 5/04* (2013.01); *H04R 2499/13* (2013.01)

(58) Field of Classification Search
CPC . H04R 5/02; H04R 1/323; H04R 5/04; H04R 2499/13; G06K 9/00845

USPC ........................................................... 381/86
See application file for complete search history.

(56) References Cited

U.S. PATENT DOCUMENTS

| 2004/0195854 | A1 | 10/2004 | Streit | |
| 2006/0262935 | A1* | 11/2006 | Goose | H04S 3/002 381/17 |
| 2009/0055180 | A1* | 2/2009 | Coon | B60R 16/0373 704/251 |
| 2012/0321102 | A1* | 12/2012 | Lim | H04R 1/403 381/97 |
| 2019/0171409 | A1* | 6/2019 | Boulanger | H04H 60/49 |

FOREIGN PATENT DOCUMENTS

| EP | 1882387 A2 | 1/2008 |
| EP | 3373132 A2 | 9/2018 |
| JP | 2004529807 A | 9/2004 |
| JP | 2010124435 A | 6/2010 |
| JP | 2010156825 A * | 7/2010 |
| JP | 2016063439 A | 4/2016 |

(Continued)

*Primary Examiner* — Ammar T Hamid
(74) *Attorney, Agent, or Firm* — Dinsmore & Shohl LLP (57) ABSTRACT

A sound input/output device for a vehicle includes: microphones that are provided within a vehicle cabin; a plurality of directional speakers that are provided within the vehicle cabin, and that output sound to respective seats; an output position specifying section that specifies a seat that is an output destination from a voice collected by one or more of the microphones or from input from an utterer of a voice; and an output control section that outputs sound from one or more of the speakers to a seat specified by the output position specifying section.

6 Claims, 9 Drawing Sheets

(56) References Cited

FOREIGN PATENT DOCUMENTS

| | | | |
|---|---|---|---|
| JP | 2017193207 | A | 10/2017 |
| WO | 2006130329 | A2 | 12/2006 |
| WO | 2014026165 | A2 | 2/2014 |

\* cited by examiner

SOUND INPUT/OUTPUT DEVICE FOR VEHICLE

CROSS-REFERENCE TO RELATED APPLICATION

This application claims priority under 35 USC § 119 from Japanese Patent Application No. 2018-172610 filed on Sep. 14, 2018, the disclosure of which is incorporated by reference herein.

BACKGROUND

Technical Field

The present disclosure relates to a sound input/output device for a vehicle.

Related Art

Japanese Patent Application Laid-Open (JP-A) No. 2004-529807 discloses a structure in which directional microphones and directional speakers are provided within a vehicle cabin.

In the technique of JP-A No. 2004-529807, when the voice of a vehicle occupant is collected by a microphone, the volume of the radio or the audio system is decreased. However, there is room for improvement in outputting sound only to an arbitrary vehicle occupant who is within the vehicle cabin.

SUMMARY

The present disclosure provides a sound input/output device for a vehicle that may output sound to only an arbitrary vehicle occupant who is within a vehicle cabin.

A first aspect of the present disclosure is a sound input/output device for a vehicle including: microphones that are provided within a vehicle cabin; a plurality of directional speakers that are provided within the vehicle cabin, and that output sound to respective seats; an output position specifying section that specifies a seat that is an output destination from a voice collected by one or more of the microphones or from input from an utterer of a voice; and an output control section that outputs sound from one or more of the speakers to a seat specified by the output position specifying section.

In the sound input/output device for a vehicle of the first aspect, the plural microphones and plural speakers are provided within the vehicle cabin, and the speakers are structured so as to be able to output sound to the respective seats. Further, the sound input/output device for a vehicle includes the output position specifying section that specifies the seat that is the output destination from a voice collected by a microphone or from input from the utterer of a voice. Moreover, the sound input/output device for a vehicle has the output control section that causes sound to be outputted from a speaker to the seat that is specified by the output position specifying section. In this way, because the seat that is the destination of output is specified by the output position specifying section, conversation may be carried out with an arbitrary vehicle occupant who is within the vehicle cabin, and music may be played-back to only an arbitrary vehicle occupant.

A second aspect of the present disclosure, in the first aspect, the sound input/output device for a vehicle may further include a vehicle occupant specifying section that specifies vehicle occupants who are seated in the seats; and a voice specifying section that specifies a source of a voice collected by one or more of the microphones, wherein, in a case in which an identifier that specifies a vehicle occupant is included m the voice collected by one or more of the microphones, the output position specifying section specifies a seat in which the specified vehicle occupant is seated as the output destination, and, in a case in which the identifier is not included in the voice collected by one or more, of the microphones, the output position specifying section specifies seats, in which vehicle occupants other than the source of the voice are seated, as output destinations.

In the sound input/output device for a vehicle of the second aspect, the vehicle occupants who are seated in the seats are specified by the vehicle occupant specifying section. Further, due to the utterer speaking toward the microphone while including the appellation that specifies the vehicle occupant with whom the utterer wishes to converse, the output position specifying section sets the seat in which that vehicle occupant is seated as the output destination. Due thereto, a vehicle occupant may converse with a specific vehicle occupant merely by a vehicle occupant speaking while including the appellation of the person with whom they wish to talk. Further, conversation may be started with the vehicle occupants other than the utterer, merely by the utterer speaking without including an appellation.

In a third aspect of the present disclosure, in the first aspect, in a case in which a predetermined word corresponding to an instruction to playback music is included in the voice collected by one or more of the microphones, the output position specifying section specifies a seat in which the source of the voice is seated as the output destination, and the output control section causes music to be played back via one or more of the speakers to the seat specified by the output position specifying section.

In the sound input/output device for a vehicle of the third aspect, the output control section sets, as the output destination, the vehicle occupant who has spoken a predetermined word. Then, music is played-back from the speaker to the seat of the vehicle occupant by the output control section. Due thereto, music may be listened to merely by a vehicle occupant uttering a predetermined word toward the microphone.

A fourth aspect of the present disclosure, in any one of the first through third aspects, the sound input/output device for a vehicle may further include a reverse phase sound generating section that generates a reverse phase sound that has a reverse phase of sound outputted from one or more of the speakers, wherein, for a seat that is specified by the output position specifying section, the output control section causes sound to be outputted from one of the speakers which corresponds to the specified seat, and simultaneously, for respective other seats different from the specified seat, causes reverse phase sound to be outputted from speakers corresponding to the other seats.

In the sound input/output device for a vehicle of the fourth aspect, the reverse phase sound is outputted from the speakers to the respective seats other than the seat to which sound is outputted. Due thereto, the sounds cancel each other out, and leakage of sound may be suppressed.

A fifth aspect of the present disclosure, in any one of the first through fourth aspects, the sound input/output device for a vehicle may further include an awake state determination section that determines awake states of vehicle occupants, wherein the output control section stops output of sound to a vehicle occupant who is determined to be sleeping by the awake state determination section.

In the sound input/output device for a vehicle relating to the fifth aspect, by stopping output of sound to a vehicle occupant who is sleeping, the sleep of the vehicle occupant is not disturbed.

A sixth aspect of the present disclosure, in the fourth aspect, the sound input/output device for a vehicle may further include an awake state determination section that determines awake states of vehicle occupants, wherein the output control section causes reverse phase sound that is generated by the reverse phase sound generating section to be outputted to a vehicle occupant who is determined to be sleeping by the awake state determination section.

In the sound input/output device for a vehicle of the sixth aspect, by outputting sound of a reverse phase to a vehicle occupant who is sleeping, even if sound is being outputted front other speakers, the sounds may cancel one another out, and the sleep of the vehicle occupant is not disturbed.

As described above, in accordance with the sound input/output device for a vehicle relating to the present disclosure, sound may be outputted to only an arbitrary vehicle occupant who is within a vehicle cabin.

BRIEF DESCRIPTION OF THE DRAWINGS

Exemplary embodiment of the present disclosure will be described in detail based on the following figures, wherein.

DETAILED DESCRIPTION

A sound input/output device 10 for a vehicle relating to an exemplary embodiment is described with reference to the drawings. Note that the dimensional ratios in the drawings are exaggerated for convenience of explanation, and there are cases in which they differ from actual dimension ratios. Further arrow FR, arrow UP and arrow RH that are illustrated appropriately in the respective drawings indicate the forward direction, the upward direction and the right side in the transverse direction of a vehicle, respectively. Hereinafter, when description is given by merely using longitudinal, vertical and left-right directions, they refer to the longitudinal of the vehicle longitudinal direction, the vertical of the vehicle vertical direction, and the left and the right when facing in the vehicle forward direction, unless otherwise indicated.

Figure 1:
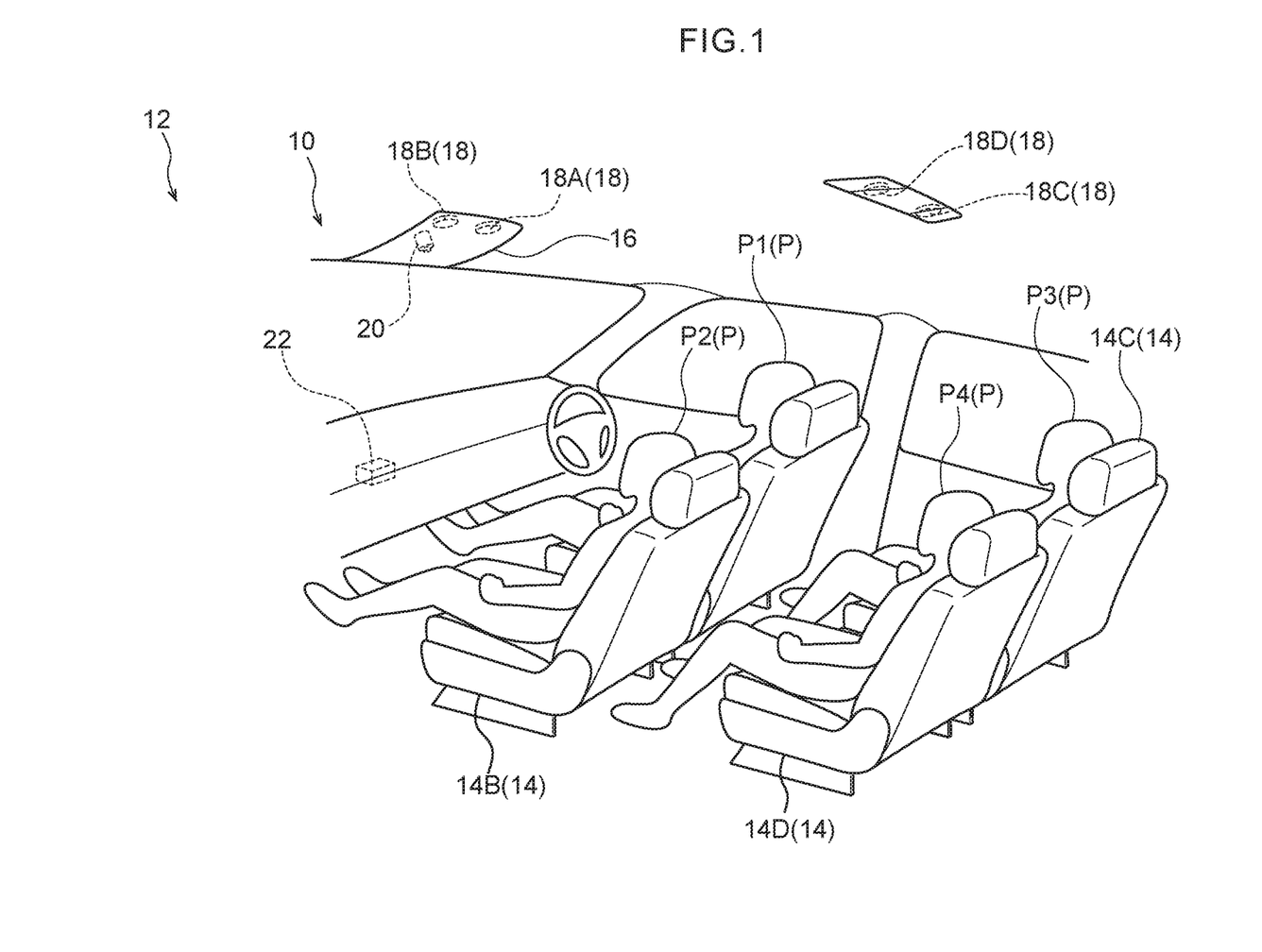
FIG. 1 is a perspective view schematically illustrating a vehicle cabin interior of a vehicle in which a sound input/output device for a vehicle relating to an embodiment is installed.

As illustrated in FIG. 1, the sound input/output device 10 for a vehicle is installed in a vehicle 12. The vehicle 12 is a so-called self-driving car at which self-traveling is possible without a vehicle occupant piloting the vehicle 12. Autonomous driving is possible due to the situation at the periphery of the vehicle 12 being acquired by sensors. Note that the vehicle 12 of the present exemplary embodiment is structured so as to be able to switch between a manual driving mode in which a vehicle occupant drives the vehicle 12, and an automatic driving mode in which the vehicle 12 is self-traveling.

Figure 3:
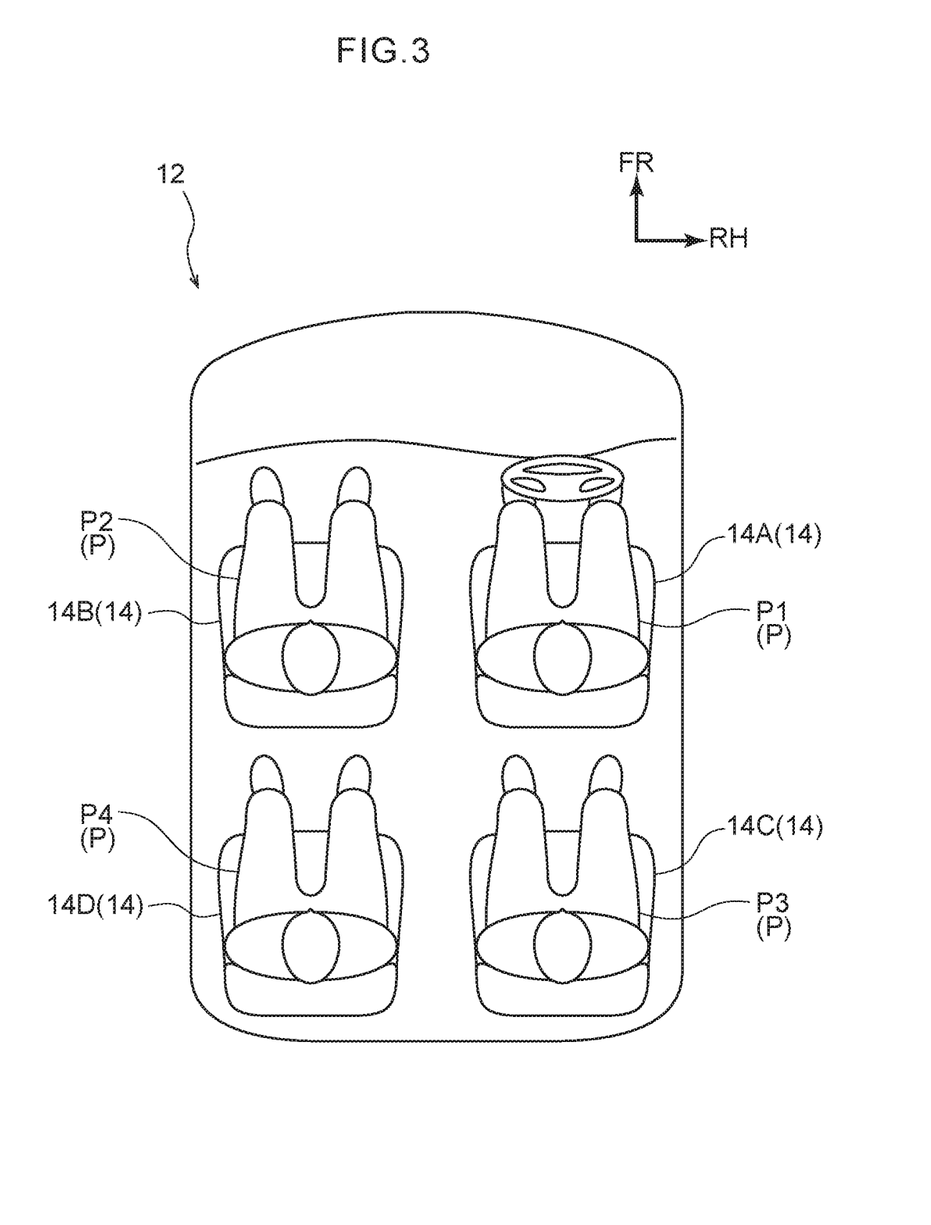
FIG. 3 is a plan view schematically illustrating the vehicle cabin interior of the vehicle in which the sound input/output device for a vehicle relating to the embodiment is installed.

Plural seats 14 are disposed within the vehicle cabin of the vehicle 12. As illustrated in FIG. 1 and FIG. 3, as an example, in the present exemplary embodiment, four of the seats 14 that are a driver's seat 14A, a front passenger's seat 14B, a rear seat 14C and a rear seat 14D are disposed.

Here, plural sound input/output portions 18 are provided in the ceiling portion of the vehicle 12. In the present exemplary embodiment, four of the sound input/output portions 18 which are a sound input/output portion 18A, a sound input/output portion 18B, a sound input/output portion 18C and a sound input/output portion 18D are provided. Each is structured to include a microphone 32 that has directionality and a speaker 34 that has directionality (see FIG. 5).

The sound input/output portion 18A and the sound input/output portion 18B are provided in an overhead console 16 that is at an obliquely front upper side of the driver's seat 14A and the front passenger's seat 14B. The sound input/output portion 18A is directed toward the driver's seat 14A. Namely, a microphone 32A of the sound input/output portion 18A is structured so as to be able to collect the voice spoken by vehicle occupant P1 who is seated in the driver's seat 14A. Further, a speaker 34A of the sound input/output portion 18A is structured so as to be able to output sound to only the vehicle occupant P1.

The sound input/output portion 18B is directed toward the front passenger's seat 14B. Namely, a microphone 32B of the sound input/output portion 18B is structured so as to be able to collect the voice spoken by vehicle occupant P2 who is seated in the front passenger's seat 14B. Further, a speaker 34B of the sound input/output portion 18B is structured so as to be able to output sound to only the vehicle occupant P2.

The sound input/output portion 18C and the sound input/output portion 18D are provided at obliquely front upper sides of the rear seat 14C and the rear seat 14D. The sound input/output portion 18C is directed toward the rear seat 14C. Namely, a microphone 32C of the sound input/output portion 18C is structured so as to be able to collect the voice spoken by vehicle occupant P3 who is seated in the rear seat 14C. Further, a speaker 34C of the sound input/output portion 18C is structured so as to be able to output sound to only the vehicle occupant P3.

The sound input/output portion 18D is directed toward the rear seat 14D. Namely, a microphone 32D of the sound input/output portion 18D is structured so as to be able to collect the voice spoken by vehicle occupant P4 who is seated in the rear seat 141. Further, a speaker 34D of the sound input/output portion 18D is structured so as to be able to output sound to only the vehicle occupant P4.

In addition to the sound input/output portion 18A and the sound input/output portion 18B, an in-cabin camera 20 is provided at the overhead console 16. The in-cabin camera 20 is directed toward the vehicle cabin interior, and is structured so as to be able to capture images of the faces of the vehicle occupants P1 through P4.

Figure 2:
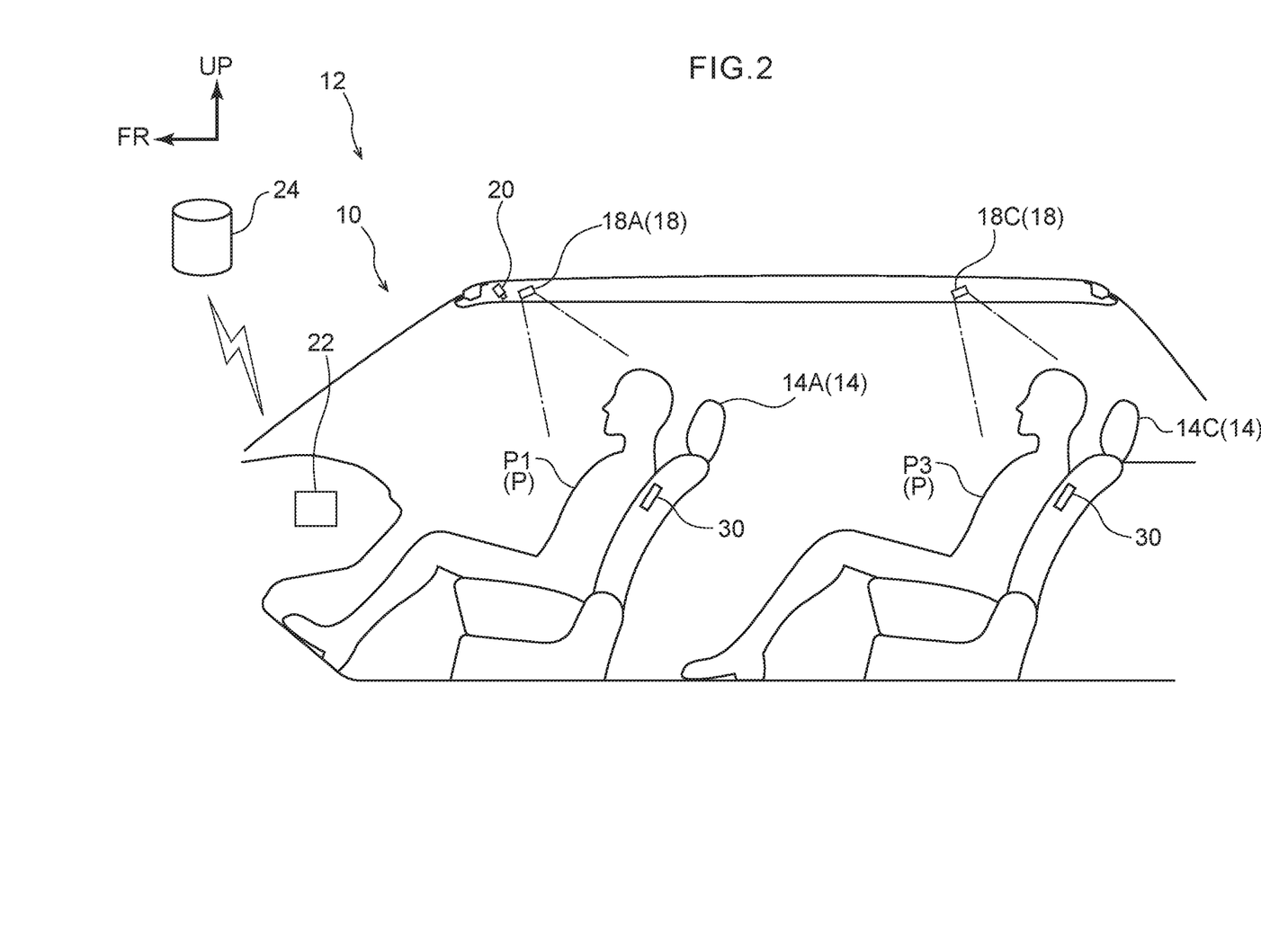
FIG. 2 is a side view schematically illustrating the vehicle cabin interior of the vehicle in which the sound input/output device for a vehicle relating to the embodiment is installed.

Here, an ECU (Electronic Control Unit) 22 that is a control section is provided at the vehicle 12. The sound input/output device 10 for a vehicle is structured to include the sound input/output portions 18, the in-cabin camera 20 and the ECU 22. Further, as illustrated in FIG. 2, the ECU 22 is structured so as to be able to connect to a server 24 via a network. Information on the vehicle occupants P1 through P4 is stored in the server 24. For example, information such as the appellation (the full or the like), an image of the face, the voiceprint, hearing ability, preferred music, and the like of the vehicle occupants P is stored. Note that, in FIG. 2, the regions that are illustrated by the one-dot chain lines are the sound collecting range of the microphone 32C and the output range of the speaker 34C of the sound input/output portion 18A and the sound input/output portion 18C.

Figure 5:
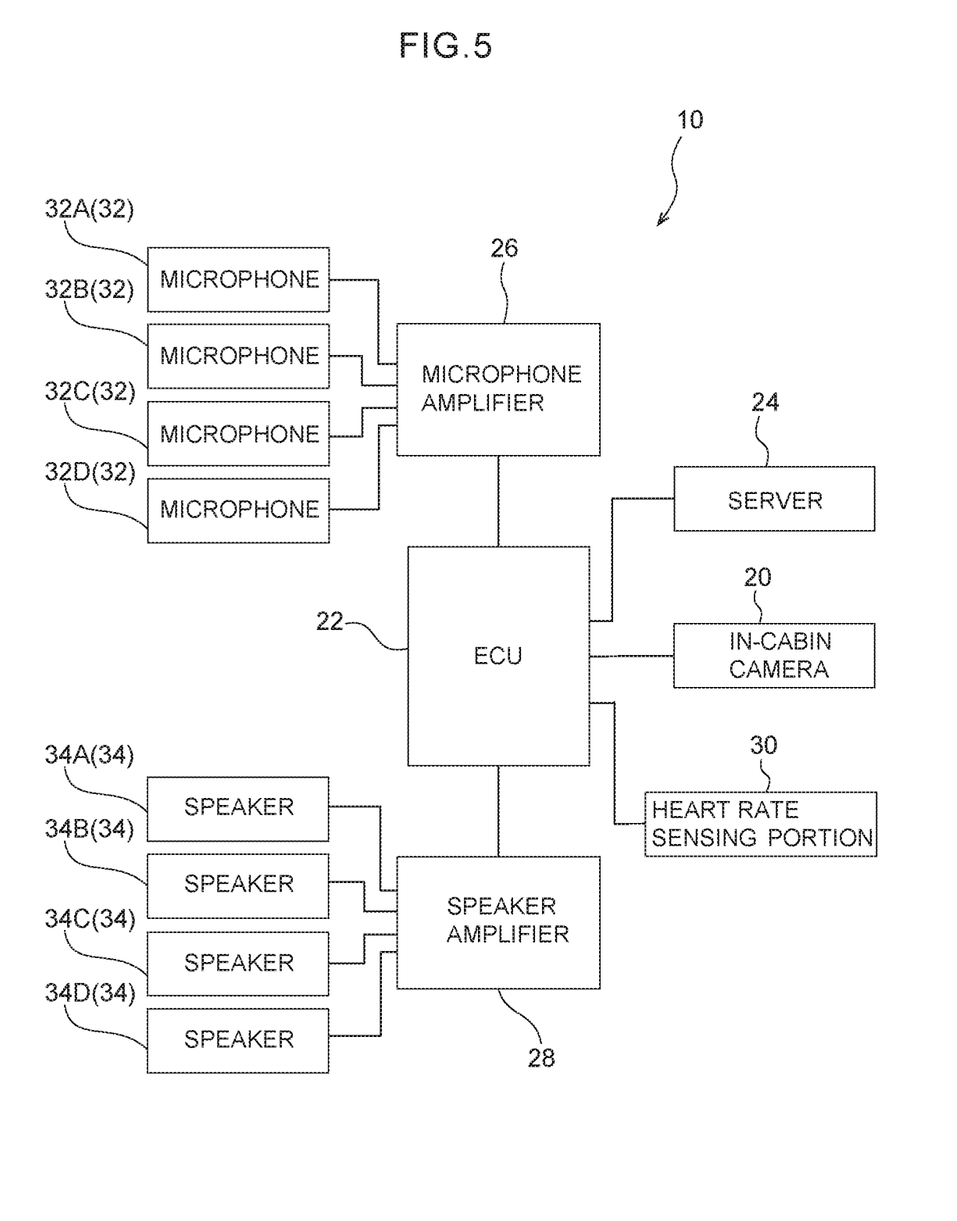
FIG. 5 is a block drawing illustrating hardware structures of the sound input/output device for a vehicle relating to the embodiment.

FIG. 5 is a block drawing illustrating the hardware structures of the sound input/output device 10 for a vehicle. As illustrated in FIG. 5, the sound input/output device 10 for a vehicle is structured to include the ECU 22, a microphone amplifier 26, a speaker amplifier 28, the four microphones 32 (the microphone 32A, the microphone 32B, the microphone 32C, the microphone 32D), the four speakers 34 (the speaker 34A, the speaker 34R, the speaker 34C, the speaker 34D), the server 24, the in-cabin camera 20, and heart rate sensing portions 30.

The microphone 32A is a microphone that structures the sound input/output portion 18A, and is electrically connected to the ECU 22 via the microphone amplifier 26. Similarly, the microphone 32B, the microphone 32C and the microphone 32D are microphones that structure the sound input/output portion 18B, the sound input/output portion 18C and the sound input/output portion 18D respectively, and are electrically connected to the ECU 22 via the microphone amplifier 26.

The speaker 34A is a speaker that structures the sound input/output portion 18A, and is electrically connected to the ECU 22 via the speaker amplifier 28. Similarly, the speaker 34B, the speaker 34C and the speaker 34D are speakers 34 that structure the sound input/output portion 18B, the sound input/output portion 18C and the sound input/output portion 18D respectively, and are electrically connected to the ECU 22 via the speaker amplifier 28.

The heart rate sensing portions 30 are devices that sense the heart rates of the vehicle occupants seated in the seats. As illustrated in FIG. 2, the heart rate sensing portions 30 are built into the back portions (the seatbacks) of the respective seats 14.

Figure 6:
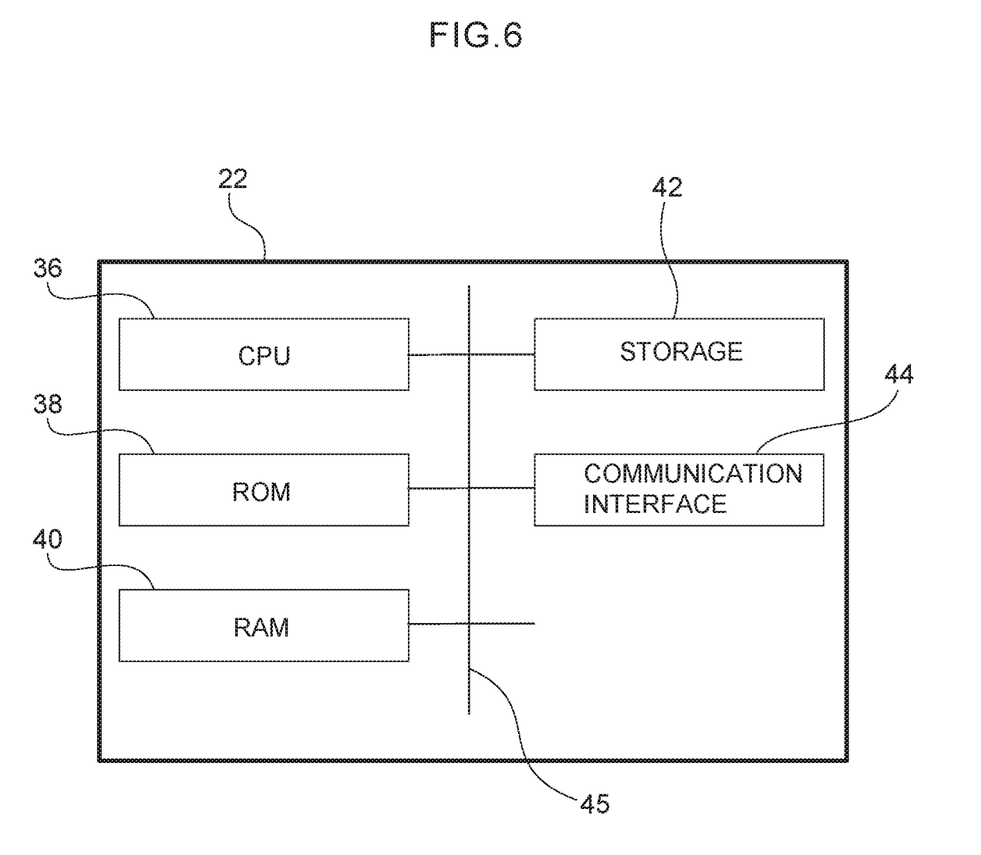
FIG. 6 is a block drawing illustrating hardware structures of an ECU.

FIG. 6 is a block drawing illustrating the hardware structures of the ECU 22. As illustrated in FIG. 6, the ECU 22 is structured to include a CPU (Central Processing Unit: processor) 36, a ROM (Read Only Memory) 38, a RAM (Random Access Memory) 40, a storage 42 and a communication interface 44. These respective structures are connected via a bus 45 so as to be able to communicate with one another.

The CPU 36 is the central computing processing unit, and executes various types of programs and controls the respective sections. Namely, the CPU 36 reads-out a program from the ROM 38 or the storage 42, and executes the program by using the RAM 40 as a work space. The CPU 36 carries out, control of the above-described respective structures and various types of computing processings in accordance with programs that are recorded in the ROM 38 and the storage 42.

The ROM 38 stores various types of programs and various types of data. The RAM 40 temporarily stores programs or data as a work space. The storage 42 is structured by an HDD (Hard Disk Drive) or an SSD (Solid State Drive), and various types of programs including the operating system, and various types of data are stored therein.

The communication interface 44 is an interface for the ECU 22 to communicate with the server 24 and other devices, and utilizes standards such as, for example, the interact, FDDI, Wi-Fi®, and the like.

The sound input/output device 10 for a vehicle realizes various types of functions by utilizing the above-described hardware resources. The functional structures that are realized by the sound input/output device 10 for a vehicle are explained with reference to FIG. 7.

Figure 7:
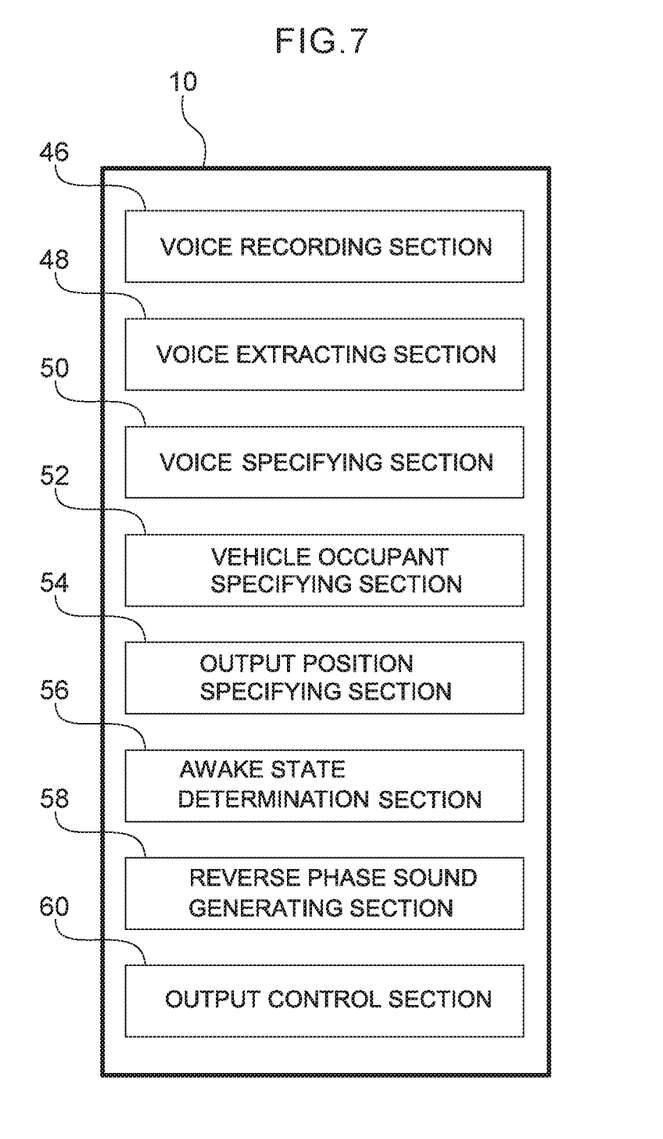
FIG. 7 is a block drawing illustrating functional structures of the sound input/output device for a vehicle.

As illustrated in FIG. 7, the sound input/output device 10 for a vehicle is structured to include, as the functional structures thereof, a voice recording section 46, a voice extracting section 48, an voice specifying section 50, a vehicle occupant specifying section 52, an output position specifying section 54, an awake state determination section 56, a reverse phase sound generating section 58, and an output control section 60. These respective functional structures are realized by the CPU 36 reading-out and executing programs that are stored in the ROM 38 and the storage 42.

The voice recording section 46 records voices that are collected by the microphones 32. The voice extracting section 48 extracts specific words from the voices recorded by the voice recording section 46. For example, appellations of vehicle occupants and words relating to the playback of music are extracted.

Figure 4:
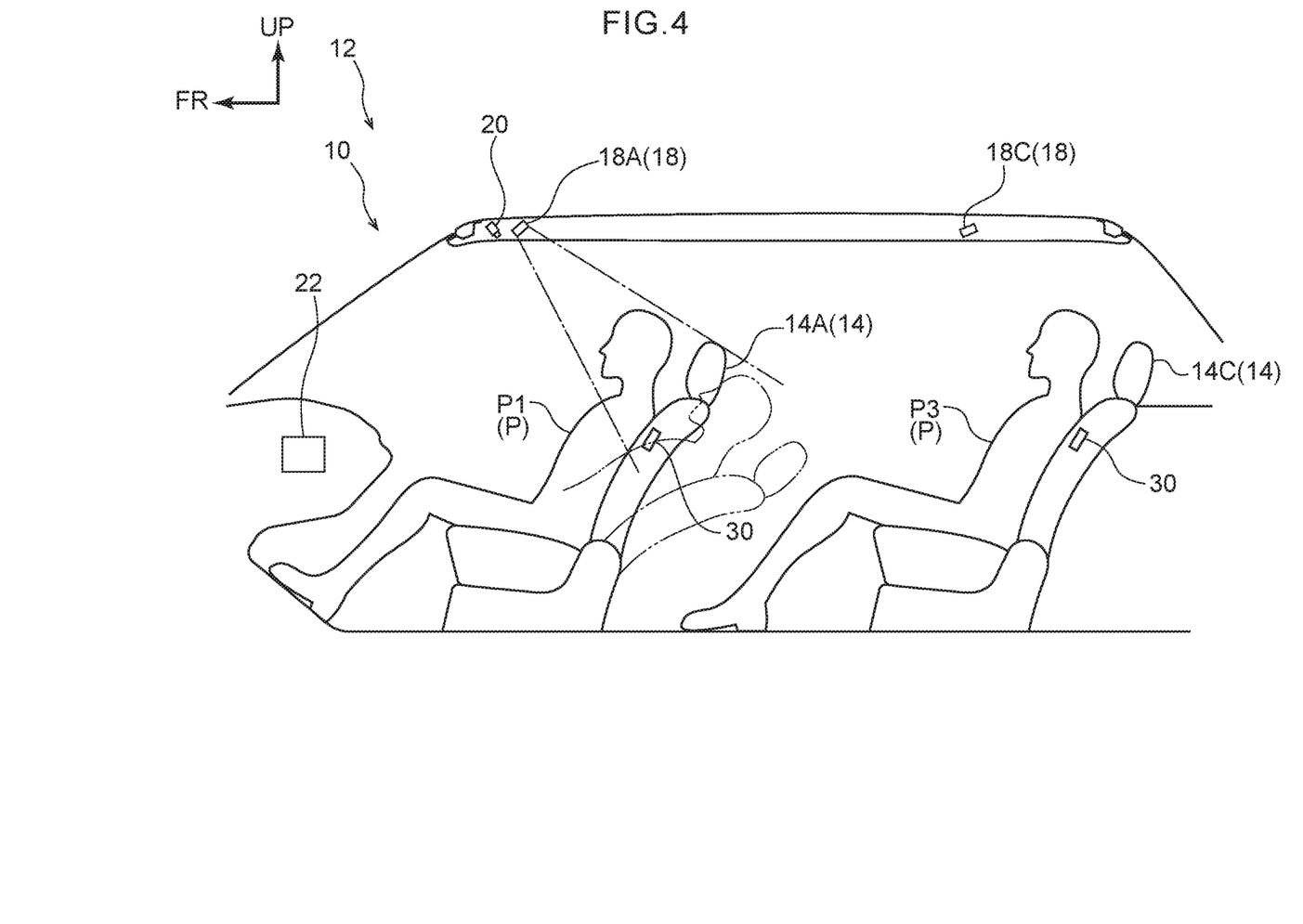
FIG. 4 is a side view schematically illustrating the vehicle cabin interior of the vehicle in which the sound input/output device for a vehicle relating to the embodiment is installed.

The voice specifying section 50 specifies the utterers of the voices that are collected by the microphones 32. For example, in FIG. 1, if a voice is collected by the microphone 32A, the voice specifying section 50 specifies that the utterer is the vehicle occupant P1. Similarly, if a voice is collected by the microphone 32B, the voice specifying section 50 specifies that the utterer is the vehicle occupant P2. Note that, in the present exemplary embodiment, even in cases in which, for example, the vehicle occupant P1 has tilted his/her seatback rearward and set the seatback in a reclined state such as illustrated in FIG. 4, the vehicle occupant P1 is within the range of sound collection by the microphone 32A, and therefore, the utterer may be specified.

The vehicle occupant specifying section 52 specifies the vehicle occupant P. Any of various methods may be employed as the method for specifying the vehicle occupant P. For example, as illustrated in FIG. 1, the vehicle occupant P may be specified by comparing the faces of the vehicle occupants P that are captured by the in-cabin camera 20 with face image data that is stored in the server 24. Further, as another method, the vehicle occupant P may be specified by comparing the voiceprint of the voice recorded by the voice recording section 46 with voiceprint data that is stored in the server 24. Moreover, the vehicle occupants P1 through P4 may be specified by the ECU 22 communicating with terminals such as the phones or the like that the vehicle occupants P1 through P4 are respectively carrying. In this case, the seats in which the vehicle occupants P are sitting may be known from positional information of the terminals.

From the voice collected by the microphone 32 or from input from the utterer of the voice (a vehicle occupant), the output position specifying section 54 specifies the seat that is the destination of output. The awake state determination section 56 determines the awake states of the vehicle occupants from signals of at least one of the in-cabin camera 20 and the heart rate sensing portions 30. Namely, the awake state determination section 56 determines whether or not the vehicle occupants are asleep.

The reverse phase sound generating section 58 generates reverse phase sounds from the voices collected at the microphones 32. Further, at the time of playing-back music, the reverse phase sound generating section 58 generates reverse phase sound of the music that is played-back. The output control section 60 causes sound to be outputted from the speaker 34 to the seat specified by the output position specifying section 54.

An example of the flow of voice inputting/outputting processing carried out by the sound input/output device 10 for a vehicle is described next with reference to the flowchart of FIG. 8. The voice inputting/outputting processing is carried out due to the CPU 36 reading-out programs from the ROM 38 and/or the storage 42, and expanding and executing them in the RAM 40. Note that the specifying of the vehicle occupants P1 through P4 by the vehicle occupant specifying section 52 is completed before the voice inputting/outputting processing is carried out.

Figure 8:
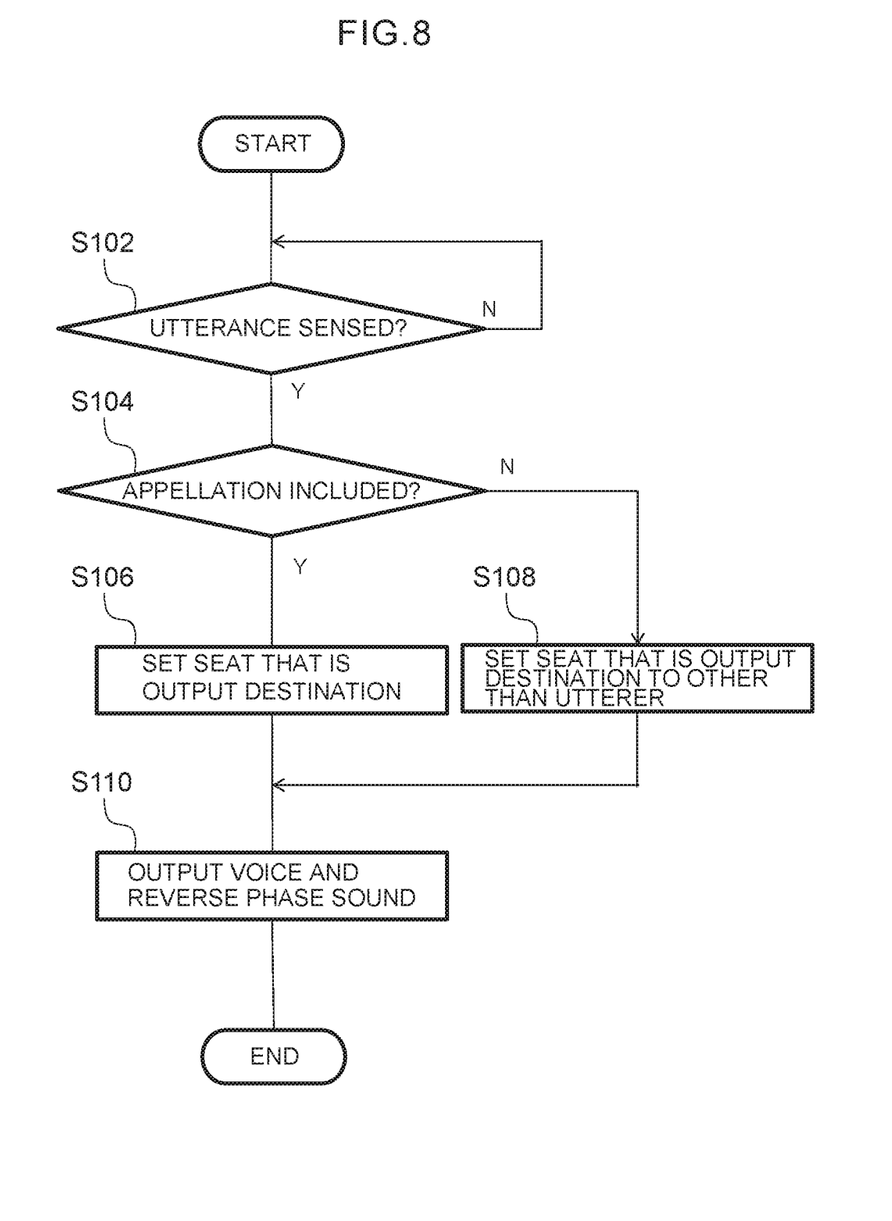
FIG. 8 is a flowchart illustrating an example of the flow of voice inputting/outputting processing.

As illustrated in FIG. 8, in step S102, the CPU 36 judges whether or not the vehicle occupants P1 through P4 have spoken through the microphones 32A through 32D. If an utterance is sensed, the CPU 36 moves on to step S104, whereas, if no utterance is sensed, the same processing is repeated until an utterance is sensed. Further, when an utterance is sensed, voice recording is started by the voice recording section 46 (see FIG. 7).

In step S104, the CPU 36 judges whether or not an appellation that specifies a vehicle occupant P is included in the uttered contents, i.e., in the voice recorded by the voice recording section 46. Concretely, it is judged whether or not the appellation of a vehicle occupant P, other than the utterer, among the vehicle occupants P1 through P4 specified by the vehicle occupant specifying section 52 is included. If an appellation that specifies a vehicle occupant P is included, the CPU 36 moves on to step S106. If an appellation of a vehicle occupant P is not included, the CPU 36 moves on to step S108. Note that appellation here means, for example, the last name.

In step S106, the CPU 36 causes the seat 14, in which the vehicle occupant P specified by the vehicle occupant specifying section 52 is sitting, to be set by the output position specifying section 54 as the output destination. On the other hand, in step S108, the CPU 36 causes the seats 14, in which the vehicle occupants P other than the utterer are seated, to be set by the output position specifying section 54 as the output destinations.

In step S110, the CPU 36 outputs the voice or reverse phase sound to the seat 14 that is the destination of output. Concretely, by the output control section 60, the CPU 36 causes a voice to be outputted from the speaker 34 that corresponds to the seat 14 that the output position specifying section 54 has set to be the output destination. Further, at the same time of causing the voice to be outputted by the output control section 60, the CPU 36 causes reverse phase sound to be outputted to the respective seats 14, other than the aforementioned seat 14, from the corresponding speakers 34. Then, the CPU 36 ends the voice inputting/outputting processing.

A case in which the vehicle occupant P1 starts talking to the vehicle occupant P3 who are illustrated in FIG. 1 and FIG. 3 is described as the above-described voice inputting/ outputting processing. In this case, in step S102, the CPU 36 judges that an utterance by the vehicle occupant P1 has been sensed by the microphone 32A, and moves processing on to step S104.

If, in step S104, the appellation of the vehicle occupant P3 is included in the voice collected from the microphone 32A that corresponds to the vehicle occupant P1, the CPU 36 moves on to step S106. Then, in step S106, the CPU 36 sets the rear seat 14C, in which the vehicle occupant P3 is seated, to be the output destination, and, in step S110 and by the output control section 60, causes the voice to be outputted from the speaker 340 that corresponds to the rear seat 14C. Further, by the output control section 60, the CPU 36 causes reverse phase sound to be outputted from the speaker 34B and the speaker 34D that correspond to the other seats 14 (the front passenger's seat 14B and the rear seat 14D).

On the other hand, if, in step S104, the appellation that specifies the vehicle occupant P3 is not included in the voice collected from the microphone 32A, the CPU 36 moves on to step S108, and sets the seats 14 in which the vehicle occupants P2 through P4 other than the vehicle occupant P1 are seated (i.e., the front passenger's seat 14B, the rear seat 14C and the rear seat 14D) as the destinations of output. Then, in step S110, the CPU 36 causes the voice to be outputted from the speaker 34B, the speaker 34C and the speaker 34D.

An example of the flow of music playback processing by the sound input/output device 10 for a vehicle is described next with reference to the flowchart of FIG. 9. The music playback processing is carried out due to the CPU 36 reading-out programs from the ROM 38 and/or the storage 42, and expanding and executing them in the RAM 40.

Figure 9:
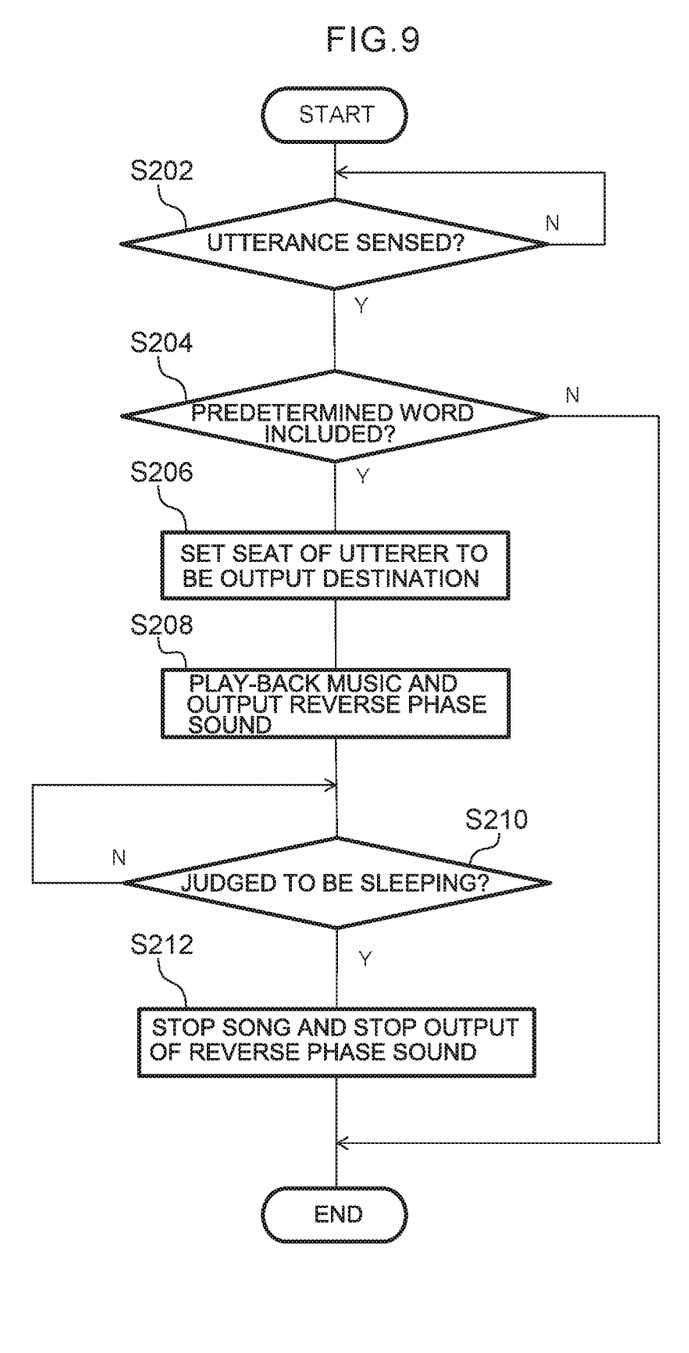
FIG. 9 is a flowchart illustrating an example of the flow of music playback processing.

As illustrated in FIG. 9, in step S202, the CPU 36 judges whether or not the vehicle occupants P1 through P4 have spoken through the microphones 32A through 32D. If an utterance is sensed, the CPU 36 moves on to step S204, whereas if no utterance is sensed, the same processing is repeated until an utterance is sensed. Further, when an utterance is sensed, voice recording is started by the voice recording section 46 (see FIG. 7).

In step S204, the CPU 36 judges whether or not a specific word is included in the uttered contents, i.e., in the voice recorded by the voice recording section 46. Concretely, it is judged whether or not a predetermined word expressing playback of music is included. For example, in a case in which the word "music" or "play" is included, it may be judged that a predetermined word is included. Then, if a predetermined word is included, the CPU 36 moves on to step S206. If a predetermined word is not included, the CPU 36 ends the processing.

In step S206, by the output position specifying section, the CPU 36 sets the seat 14 of the utterer to be the output destination, and moves on to step S208. In step S208, by the output control section 60, the CPU 36 causes music to be played-back from the speaker 34 that corresponds to the seat 14 of the utterer. Further, by the output control section 60, at the same time of causing music to be played-back, the CPU 36 causes reverse phase sound to be outputted to the respective seats 14, other than the aforementioned seat 14, from the corresponding speakers 34. Note that, at this time, the songs that are played-back may be changed in accordance with the tastes of the vehicle occupant P.

In next step S210, the CPU 36 judges by the awake state determination section 56 whether or not the vehicle occupant P is asleep. Concretely, it is judged that the vehicle occupant P is asleep in a case in which a sleeping state of the vehicle occupant P is sensed from signals of at least one of the in-cabin camera 20 and the heart rate sensing portion 30 (see FIG. 5).

If it is judged in step S210 that the vehicle occupant P is asleep, the CPU 36 moves on to step 212. If the judgment as to whether the vehicle occupant P is sleeping is negative (i.e., if the vehicle occupant P is not sleeping), the CPU 36 continues the playing-back of songs, and the processing of step S210 is repeated.

In step S212, the CPU 36 causes the output control section 60 to stop the playback of songs, and, at the same time, to stop the outputting of reverse phase sound. Then, the CPU 36 ends the music playback processing.

Operation

Operation of the present exemplary embodiment is described next.

At the sound input/output device 10 for a vehicle of the present exemplary embodiment, the seat that is the destination of output may be specified by the output position specifying section 54, as described in step S106 of the flowchart of FIG. 8. Due thereto, conversation may take place with an arbitrary vehicle occupant P who is within the vehicle cabin.

Further, in the present exemplary embodiment, the vehicle occupants P who are seated in the seats 14 may be specified by the vehicle occupant specifying section 52. Due to an utterer talking toward the microphone 32 while including the appellation of a vehicle occupant P with whom the utterer wishes to converse, the seat 14 in which the vehicle occupant P of that appellation is seated may be set as the output destination. Due thereto, a conversation may take place with a specific vehicle occupant P merely by a vehicle occupant P speaking while including the appellation of the person with whom they wish to talk. Further, conversation may be started with the vehicle occupants P other than the utterer, merely by the utterer speaking without including an appellation.

Moreover, in the present exemplary embodiment, music may be listened to merely by the vehicle occupant P uttering a predetermined word toward the microphone 32, as described in the flowchart of FIG. 9. Further, by causing reverse phase sound to be outputted from the speakers 34 toward the respective seats 14 other than the seat 14 to which a voice or music is outputted, sound may be cancelled-out, and leaking of sound to the other vehicle occupants P may be suppressed.

Still further, in the present exemplary embodiment, the awake state determination section 56 is provided. By stopping output of sound to the vehicle occupant P who is sleeping, the sleep of the vehicle occupant P is not disturbed.

Although an exemplary embodiment has been described above, the present disclosure may of course be implemented in various forms within a scope that does not depart from the gist thereof. For example, in the above-described exemplary embodiment, reverse phase sound is outputted by the output control section 60 in step S110 of the voice inputting/outputting processing illustrated in FIG. 8 and in step S208 of the music playback processing illustrated in FIG. 9. However, the present disclosure is not limited to this. In a case in which the speakers 34 have directionality such as in the present exemplary embodiment, leaking of sound to the other vehicle occupants P may be suppressed even if reverse phase sound is not outputted. However, in some embodiments, reverse phase sound may be output from the standpoint of suppressing sound leakage.

Further, in the above-described exemplary embodiment, in the voice inputting/outputting processing that is illustrated in FIG. 8, output from the speaker 34 may be stopped in a case in which the awake state determination section 56 determines that the vehicle occupant P is asleep, in the same way as in the music playback processing of FIG. 9. In this case, by notifying the utterer that the vehicle occupant P of the output destination is asleep, the utterer may know of the state of the vehicle occupant P of the output destination. Further, in a case in which a voice is outputted to plural vehicle occupants P, it may be made such that reverse phase sound is outputted from the speaker 34 of the vehicle occupant P who is sleeping.

Moreover, the output control section 60 may automatically adjust the volume in accordance with the hearing ability of the vehicle occupant P of the output destination. For example, if it is judged, from information stored in the server 24, that the vehicle occupant P is an elderly person and has poor hearing ability, the output control section 60 may output sound at a volume higher than the standard volume. Further, the output control section 60 may output sound by enhancing the frequency band of consonants that are necessary in order for the vehicle occupant P to hear the conversation.

Still further, in the above-described exemplary embodiment, in a case in which a specific appellation is included in the voice recorded by the voice recording section 46, the output position specifying section 54 sets the seat, in which the vehicle occupant of that appellation is seated, to be the destination of output. However, the present disclosure is not limited to this, and the output destination may be set by another method. For example, buttons or the like on which seat numbers are marked may be provided at the peripheries of the respective seats 14, and the output destination may be set by the utterer pushing, in advance, a seat number nearby. Namely, the output position specifying section 54 species the seat that is the output destination, from input from the utterer. In this case, conversation is possible even between the vehicle occupants P who do not know each others' names.

Note that any of various types of processors other than the CPU 36 may execute the processings that the CPU 36 executes by reading out software (programs) in the above-described respective exemplary embodiments. Examples of processors in this case include PLDs (Programmable Logic Devices) whose circuit structure may be changed after production such as FPGAs (Field-Programmable Gate Arrays) and the like, or dedicated electrical circuits that are processors having circuit structures that are designed for the sole purpose of executing specific processings such as ASICs (Application Specific Integrated Circuits) and the like, or the like. Further, the above-described processings may be executed by one of these various types of processors, or may be executed by combining two or more of the same type or different types of processors (e.g., plurals FPGAs, or a combination of a CPU and an FPGA, or the like). Further, the hardware structures of these various types of processors are, more concretely, electrical circuits that combine circuit elements such as semiconductor elements and the like.

Moreover, although the storage 42 is used as the recording section in the above-described respective exemplary embodiments, the present disclosure is not limited to this, A recording medium such as, for example, a CD (Compact Disk), a DVD (Digital Versatile Disk), a USB (Universal Serial Bus) memory, or the like may be made to be the recording section.

What is claimed is:

1. A sound input/output device for a vehicle, comprising:
   microphones that are provided within a vehicle cabin;
   a plurality of directional speakers that are provided within the vehicle cabin, and that output sound to respective seats;
   an output position specifying section that specifies a seat that is an output destination based on a voice collected by one or more of the microphones; and
   an output control section that outputs sound from one or more of the speakers to a seat specified by the output position specifying section.

2. The sound input/output device for a vehicle of claim 1, further comprising:
   a vehicle occupant specifying section that specifies vehicle occupants who are seated in the seats; and
   a voice specifying section that specifies a source of a voice collected by one or more of the microphones,
   wherein, in a case in which an identifier that specifies a vehicle occupant is included in the voice collected by one or more of the microphones, the output position specifying section specifies a seat in which the specified vehicle occupant is seated as the output destination, and, in a case in which the identifier is not included in the voice collected by one or more of the microphones, the output position specifying section specifies seats, in which vehicle occupants other than the source of the voice are seated, as output destinations.

3. The sound input/output device for a vehicle of claim 1, wherein:
   in a case in which a predetermined word corresponding to an instruction to playback music is included in the voice collected by one or more of the microphones, the output position specifying section specifies a seat in which the source of the voice is seated as the output destination, and
   the output control section causes music to be played back via one or more of the speakers to the seat specified by the output position specifying section.

4. The sound input/output device for a vehicle of claim 1, further comprising a reverse phase sound generating section that generates a reverse phase sound that has a reverse phase of sound outputted from one or more of the speakers,
   wherein, for a seat that is specified by the output position specifying section, the output control section causes sound to be outputted from one of the speakers which corresponds to the specified seat, and simultaneously, for respective other seats different from the specified seat, causes reverse phase sound to be outputted from speakers corresponding to the other seats.

5. The sound input/output device for a vehicle of claim 1, further comprising an awake state determination section that determines awake states of vehicle occupants,
   wherein the output control section stops output of sound to a vehicle occupant who is determined to be sleeping by the awake state determination section.

6. The sound input/output device for a vehicle of claim 4, further comprising an awake state determination section that determines awake states of vehicle occupants,
   wherein the output control section causes reverse phase sound that is generated by the reverse phase sound generating section to be outputted to a vehicle occupant who is determined to be sleeping by the awake state determination section.

* * * * *

UNITED STATES PATENT AND TRADEMARK OFFICE
CERTIFICATE OF CORRECTION

PATENT NO. : 10,805,730 B2  
APPLICATION NO. : 16/568570  
DATED : October 13, 2020  
INVENTOR(S) : Hideyuki Sakurai, Masashi Mori and Katsuya Shimazu Page 1 of 1

It is certified that error appears in the above-identified patent and that said Letters Patent is hereby corrected as shown below:

On the Title Page

Item (72), inventor 1, city, delete "Toyota" and insert --Toyota-shi, Aichi-ken--, therefor.

Item (72), inventor 2, city, delete "Nagoya" and insert --Nagoya-shi, Aichi-ken--, therefor.

Item (72), inventor 3, city, delete "Toyota" and insert --Toyota-shi, Aichi-ken--, therefor.

In the Specification

In Column 2, Line(s) 5, after "included", delete "m" and insert --in--, therefor.

In Column 2, Line(s) 10, after "more", delete ",".

In Column 3, Line(s) 16, delete "front" and insert --from--, therefor.

In Column 5, Line(s) 63, after "out", delete ",".

In Column 8, Line(s) 11, after "speaker", delete "340" and insert --34C--, therefor.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*